US006826241B2

(12) United States Patent
Kahana

(10) Patent No.: US 6,826,241 B2
(45) Date of Patent: Nov. 30, 2004

(54) APPARATUS AND METHOD FOR FILTERING MAXIMUM-LENGTH-CODE SIGNALS IN A SPREAD SPECTRUM COMMUNICATION SYSTEM

(75) Inventor: Emmanuel Kahana, Chigaco, IL (US)

(73) Assignee: Motorola, Inc., Schaumburg, IL (US)

( * ) Notice: Subject to any disclaimer, the term of this patent is extended or adjusted under 35 U.S.C. 154(b) by 786 days.

(21) Appl. No.: 09/790,005

(22) Filed: Feb. 21, 2001

(65) Prior Publication Data

US 2002/0114412 A1 Aug. 22, 2002

(51) Int. Cl.[7] .............................. H03D 1/00; H04L 27/06
(52) U.S. Cl. ....................... 375/343; 375/350; 375/285; 375/130
(58) Field of Search .................................. 375/142, 143, 375/144, 148, 150, 152, 229, 285, 343, 346, 348, 350; 708/300, 322, 323, 314, 426

(56) References Cited

U.S. PATENT DOCUMENTS

| | | | | |
|---|---|---|---|---|
| 4,583,048 A | * | 4/1986 | Gumacos et al. | ............ 329/302 |
| 5,197,052 A | | 3/1993 | Schröder et al. | .............. 369/25 |
| 5,278,567 A | * | 1/1994 | Nourrcier | .................... 342/202 |
| 5,297,171 A | * | 3/1994 | Koch | .......................... 375/347 |
| 5,602,832 A | * | 2/1997 | Hudson | ....................... 370/342 |
| 5,938,611 A | | 8/1999 | Muzilla et al. | |
| 6,067,517 A | | 5/2000 | Bahl et al. | ................... 704/256 |
| 6,084,927 A | | 7/2000 | Pon | |
| 6,122,614 A | | 9/2000 | Kahn et al. | .................. 704/235 |
| 6,434,366 B1 | * | 8/2002 | Harrison et al. | ............... 455/69 |

OTHER PUBLICATIONS

Nigel Ward et al., "Prosodic features which cue back-channel responses in English and Japanese", Journal of Pragmatics, vol. 32, (2000) pps. 1177–1207.
H. Rohling; "Mismatched–Filter Design for Periodical Binary Phased Signals"; IEEE Transactions on Aerospace and Electronic System, vol. 25, No. 6, Nov. 1989; pp. 890–897.
D. Yan and P. Ho; "Code Acquisition in a CDMA System based on Barker Sequence and Differential Detection"; IEEE 1995; pp. 233–236.
M.N. Cohen, M.R. Fox, J. M. Baden; "Minimum Peak Sidelobe Pulse Compression Codes"; IEEE International Radar Conference, 1990; pp. 633–638.
H.J. Blinchioff; "Range Sidelobe Reduction for the Quadriphase Codes"; IEEE Transactions on Aerospace and Electronic Systems; vol. 32. No. 2; Apr. 1996; pp. 668–675.

* cited by examiner

Primary Examiner—Jean B. Cornelius
(74) Attorney, Agent, or Firm—Lalita W. Pace

(57) ABSTRACT

An apparatus (200) and method (700) for filtering maximum length code signals in a spread spectrum communication system including a plurality of base stations (102, 110, 118) and mobile stations (104, 106, 108, 112, 114, 116, 120, 122, 124). The apparatus receives a plurality of maximum length codes and decodes them by autocorrelation producing an impulse-like form with a peak value equal to the code length and time-sidelobes equal to a non-zero value. The time-sidelobes are the autocorrelation resulsts for time-offset codes. The apparatus and method calculates weighting coefficients to be used to reduce the time-sidelobes to zero which reduces signal interference and allows an increase in system capacity.

7 Claims, 4 Drawing Sheets

APPARATUS AND METHOD FOR FILTERING MAXIMUM-LENGTH-CODE SIGNALS IN A SPREAD SPECTRUM COMMUNICATION SYSTEM

FIELD OF THE INVENTION

The invention relates to the field of communication systems, and more particularly, to spread spectrum communication systems, such as a code division multiple access (CDMA) communication system.

BACKGROUND OF THE INVENTION

Orthogonal scrambling codes such as Pseudorandom codes (PN codes) also referred to as maximum length codes (MLC) are used in spread spectrum communication systems, such as CDMA systems, to distinguish between a plurality of base transceiver stations (BTSs) that transmit on the same radio frequency (RF). Typically, the MLC of each BTS in the system can be the same, but offset in time. For example, a first BTS in the system may be assigned a 7-bit code of 0111001, a second BTS in the system may be assigned a 7-bit code of 1110010 and a third BTS in the system may be assigned a 7-bit code of 1100101. A shown in this example, the second and third codes are a delayed in time replica of the first code. Orthogonal channelization codes are used in spread spectrum communication systems, such as CDMA systems, to distinguish between a plurality of mobile stations (MSs) that transmit on the same radio frequency (RF). Scrambling codes and channelization codes are also used to modulate the signals transmitted by the BTS and/or MS, thereby creating the characteristic spread spectrum.

In a communication system including multiple BTSs and MSs, at any given time, a particular BTS or MS in question may simultaneously receive multiple signals scrambled by a MLC transmitted from the various MSs or BTSs, respectively. The receiver of the BTS or MS in question will decode the signals by autocorrelation. Since the signals are continuous and repetitive, a mapping of the autocorrelation will ideally have an impulse-like form, with the peak value equal to the code length, and normalized time-sidelobes equal to −1. The time-sidelobes can be viewed as the autocorrelation result for the BTSs or MSs with codes offset in time from the BTS or MS in question.

The problem of reducing time-sidelobes of binary codes has been discussed in many articles, in the context of pulse compression radar. In one article, two methods of achieving low time-sidelobes are presented. The first method analyzes the signal characteristics and the second method utilizes an exhaustive computer search. These methods are suitable for radar signals, which are not continuous, but are not optimum for spread spectrum communication, which uses continuous signals. Another article deals with low time-sidelobes signals in CDMA systems, but only as a preamble signal for improving the synchronization. Yet another article explores the possibility of zeroing the time-sidelobes in continuous and periodic binary signals, by using a mismatched filter. The analysis does not address maximum-length-codes (PN codes) used in CDMA, but rather addresses general binary codes in radar applications. Furthermore, the mismatch filter described in the article has a length equal to the signal length, and does not use the matched-weighting filter cascade concept. Hence, the filter coefficients are not binary and are not optimized for MLC.

When multiple transmitted signals are received at one receiver, the time-sidelobes combine and add up to create interference, which can eventually limit network capacity. Thus there is a need for a filter that reduces the time-sidelobes to zero, thereby reducing the signal interference and allowing an increase in network capacity.

DETAILED DESCRIPTION OF THE INVENTION

The present invention provides an apparatus and method for decoding signals coded by MLC and reducing time-sidelobes produced therefrom to zero. Reducing the time-sidelobes to zero reduces the signal interference and allows an increase in system capacity.

Figure 1:
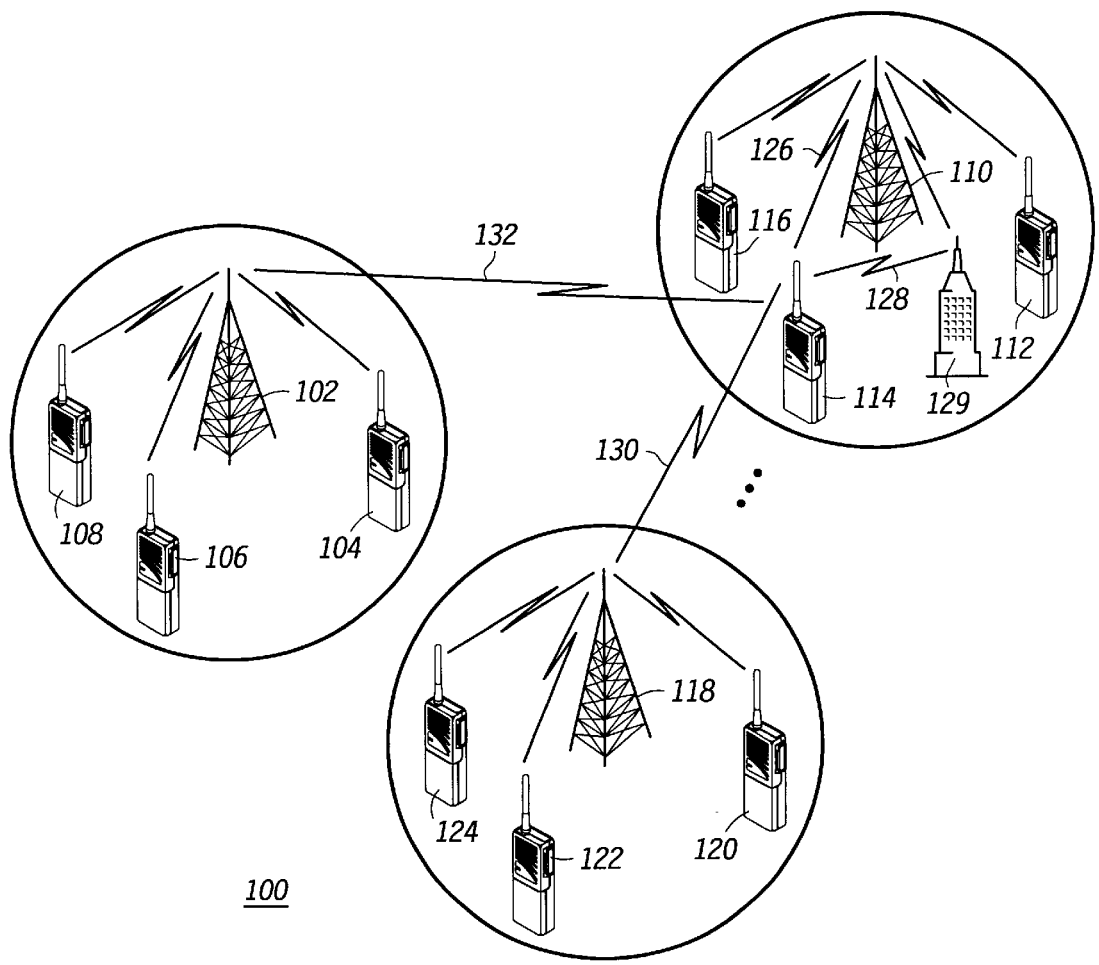
FIG. 1 is a functional block diagram of a communication system that can implement the apparatus and method of the present invention.

Referring to FIG. 1, a communication system 100 including three cells is shown. Three cells are shown, but it should be recognized by one of ordinary skill in the art that the communication system 100 can include more than three cells. In the communication system 100 of FIG. 1, each cell includes a BTS 102, 110, 118 and multiple MSs 104, 106, 108, 112, 114, 116, 120, 122, 124. It should be recognized by one of ordinary skill in the art that each cell can include more than three MSs. In high traffic situations, each BTS 102, 110, 118 and MS 104, 106, 108, 112, 114, 116, 120, 122, 124 may receive multiple signals transmitted from multiple sources. For example, FIG. 1 shows MS 114 receiving signals 126, 130, 132 from all three BTSs 102, 110, 118 and receiving a delayed signal 128 from BTS 110 due to multipath. All of these signals are modulated by a MLC to distinguish the BTSs that are transmitting the signals. At the MS receiver, the signals 126, 128, 130, 132 are decoded by autocorrelation. While the MS 114 is in the cell serviced by the BTS 110 as shown in FIG. 1, the autocorrelation will produce a desired signal, which is the signal 126 received from the BTS 110 and undesired signals, which are the signals 132, 130 received from the BTSs 102, 118 and the multipath signal 128. In the prior art, the ideal normalized autocorrelation of the undesired delayed signals produces time-sidelobes equal to −1. These time sidelobes can be viewed as autocorrelation results for the delayed in time replicas of the desired code (time-offset codes). In the communication system of FIG. 1, the delayed in time replicas are for the plurality of signals transmitted by the BTSs and the multipath signal 128 generated by a signal from BTS 110 bouncing off building 129. As previously stated, the time sidelobes combine and add to create interference. The present invention describes a mismatched filter which reduces the time-sidelobess to zero, thus reducing the signal interference and allowing an increase in system capacity.

Figure 2:
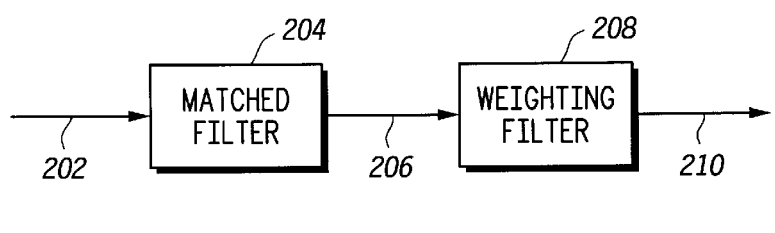
FIG. 2 is a block diagram of a mismatched filter that can be used with the present invention.

Referring to FIG. 2, a mismatched filter 200 is shown. In the presently preferred embodiment, the filter 200 resides in the MS 114 receiver. In the case where the BTS needs to distinguish between a plurality of signals received from a plurality of MSs, the filter 200 could reside in the BTS. The mismatched filter 200 preferably includes a matched filter 204 and a weighting filter 208 cascaded in series. It should be recognized by one of ordinary skill in the art that the cascade of two filters can be implemented as one filter equivalent to the convolution of the two filters. The matched filter 204 receives an N-bit input code 202, such as an MLC, and produces an N-bit matched filter output code 206 which is fed into the weighting filter 208. The weighting filter 208, in turn, produces an N-bit mismatched filter output code 210.

Figure 3:
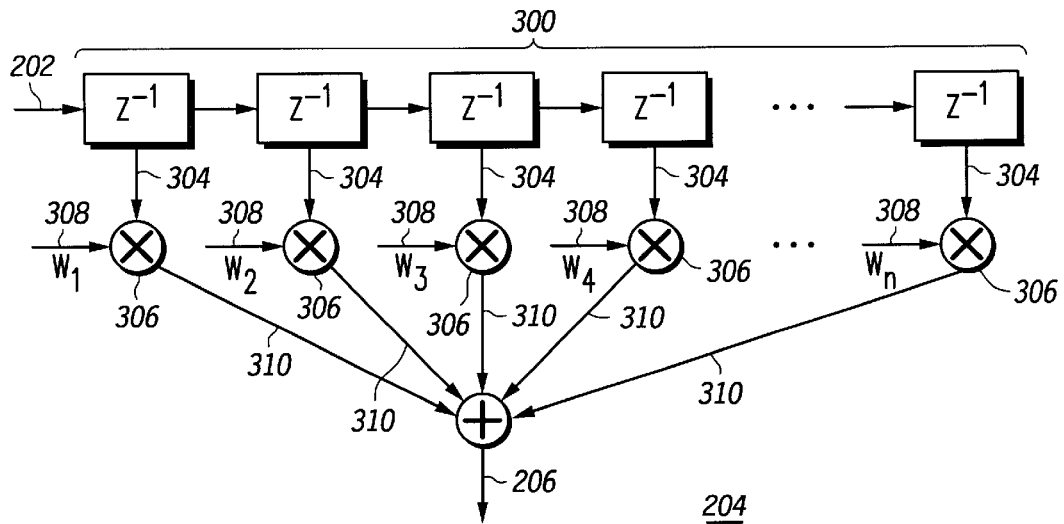
FIG. 3 is a detailed diagram of the matched filter component of the mismatched filter of FIG. 2.
Figure 4:
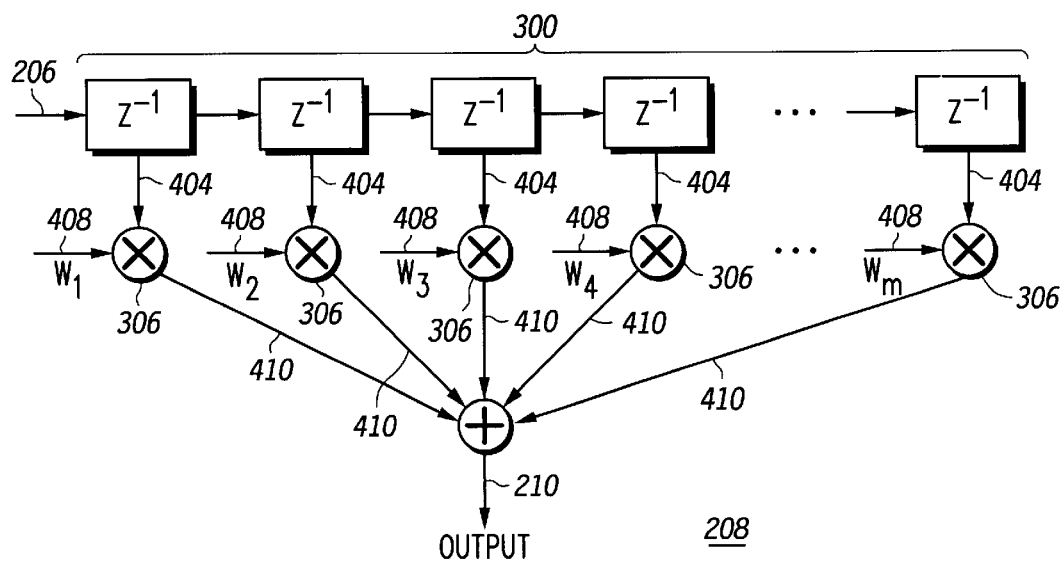
FIG. 4 is a detailed diagram of the weighting filter component of the mismatched filter of FIG. 2.

Referring to FIGS. 3 and 4, a detailed diagram of the matched filter 204 and weighting filter 208 is shown, with like elements sharing the same numerals. Both filters 204, 208 are known in the art and can be implemented by specialized hardware/software, or by a standard signal processor, such as "Starcore" manufactured by Motorola, Inc. As shown in FIG. 3, the matched filter 204 receives an N-bit code 202 which is input to a tapped delay line, including N delaying components 300. The outputs 304 from the components 300 are fed into multipliers 306 along with an N-bit weighting factor 308, to yield a first N-bit result 310. Each bit of the N-bit result 310 is summed to produce a first sum 206 representing the amplitude of the N-bit code 202. The mathematical computations just described can be represented by the equation:

$$I_1 w_1 + I_2 w_2 + \ldots I_N W_N \quad (1)$$

where I represents a bit of an N-bit input, w represents a weighting coefficient of an N-bit weighting factor and N represents the maximum amount of bits of the input or weighting factor. The N-bit code 202 is shifted and fed back into the matched filter 204 to produce a first sum 206 (for the second time) representing the amplitude of the shifted N-bit code 202 (delayed in time replica of the N-bit code). This process is repeated until the N-bit code 202 has been shifted N-1 times and the matched filter 204 has produced an N-bit matched filter output 206, with each bit representing the amplitude of the code 202 input to the filter 204.

Referring to FIG. 4, the N-bit matched filter output 206 is fed into a weighting filter 208 having a tapped delay line, including N delaying components 300. The outputs 404 from the components 300 are fed into multipliers 306 along with a second N-bit weighting factor 408, to yield a second N-bit result 410. Each bit of the second N-bit result 410 is summed to produce a second sum 210 representing the amplitude of the N-bit matched filter output 206. The N-bit matched filter output 206 is shifted and fed back into the weighting filter 208 to produce the second sum 412 (for the second time) representing the amplitude of the shifted N-bit matched filter output 206 (delayed in time replica of the N-bit matched filter output 206). This process is repeated until the N-bit matched filter output 206 has been shifted N-1 times and the weighting filter 208 has produced an N-bit mismatched filter output 210, with each bit representing the amplitude of the code 206 input to the filter 208.

Figure 5:
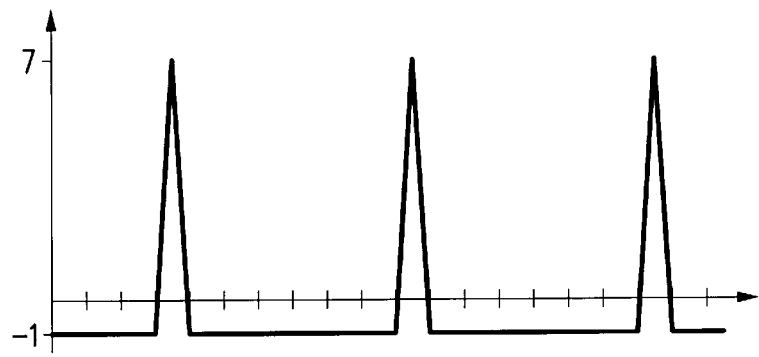
FIG. 5 is a tabular and graphical illustration of the matched filter output produced by the matched filter component of FIG. 3.

The table in FIG. 5 provides the output 206 for a 7-bit matched filter input code 202 equal to "−1 1 1 1 −1 −1 1." A 7-bit code would be used in a system containing seven (7) base stations, one (1) base station transmitting signals scrambled by a MLC and six (6) base stations transmitting signals scrambled by a time-delayed replica of the MLC. Such a system can be represented by the system of FIG. 1 with the amount of cells equal to seven (7), instead of three (3) as shown. For the matched filter 204, the 7-bit weighting factor 308 is equal to the 7-bit matched filter input code 202 "−1 1 1 1 −1 −1 1." As seen in the table, for a 7-bit matched filter input 202 of "−1 −1 −1 1," a 7-bit matched filter output 206 of "−1 −1 −1 7 −1 −1 −1" results. The values of "−1" in the output represent time-sidelobes. The time-sidelobes are generated from autocorrelation of the delayed in time replicas of the 7-bit matched filter input 202. The output 206 is also shown graphically in FIG. 5.

Referring back to FIG. 2, after the N-bit matched filter input 202 has been shifted N-1 times and processed by the matched filter 204, the resulting N-bit matched filter output 206 is fed into a weighting filter 208. However, in the weighting filter 208, the N-bit weighting factor 408, is computed such that the signal processing through the weighting filter 208 will reduce the time sidelobes to zero. To calculate the coefficients of the weighting filter, we assume a symmetric filter with the center coefficient defined as $a_0$ and all other coefficients $a_1$. For an input code 206 of length N, the main (desired) output $b_0$ and the time offset outputs (undesired outputs) $b_1$ are given by the following equations:

$$b_0 = N a_0 - (N-1) a_1 \quad (2)$$

$$b_1 = -a_0 + 2 a_1 \quad (3)$$

Since the goal is to reduce the time-sidelobes to zero, $b_1$ in the above equation is set to zero. Thus, equation (3) is reduced to:

$$a_0 = 2 a_1 \quad (4)$$

For $a_0=2$, equations (4) and (2) above yield $a_1=1$ and $b_0=N+1$. Other values of $a_0$ may be chosen and equations (4) and (2) used to solve for $a_1$ and $b_0$, respectively. In the current example, we obtain an N-bit weighting factor 408 ($a_1$ $a_1$ $a_0$ $a_1$ $a_1$ $a_1$ $a_1$) of "1 1 1 2 1 1 1" ($a_0=2$ in the center and $a_1=1$ everywhere else).

Figure 6:
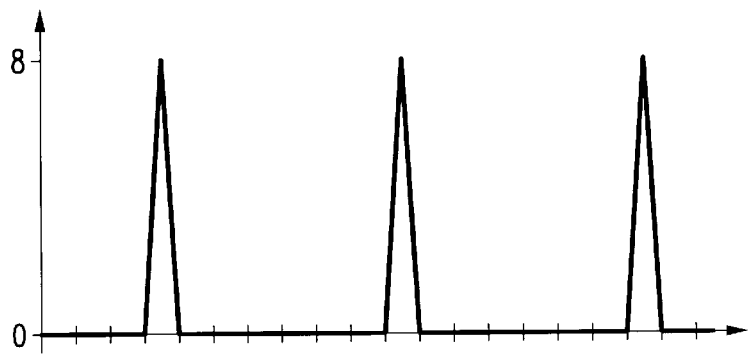
FIG. 6 is a tabular and graphical illustration of the mismatched filter output produced by the weighting filter component of FIG. 4.

The table in FIG. 6 provides the output 210 for a 7-bit matched filter output 206 "−1 −1 −1 7 −1 −1 −1." In the current example, the 7-bit weighting factor 408 is equal to "1 1 1 2 1 1 1." As seen in the table, for a 7-bit matched filter output 206 of "−1 −1 −1 7 −1 −1 −1", a 7-bit mismatched filter output 210 of "0 0 0 8 0 0 0" results. The values of "0" in the output represent the time-sidelobes. The output is also shown graphically in FIG. 6.

Figure 7:
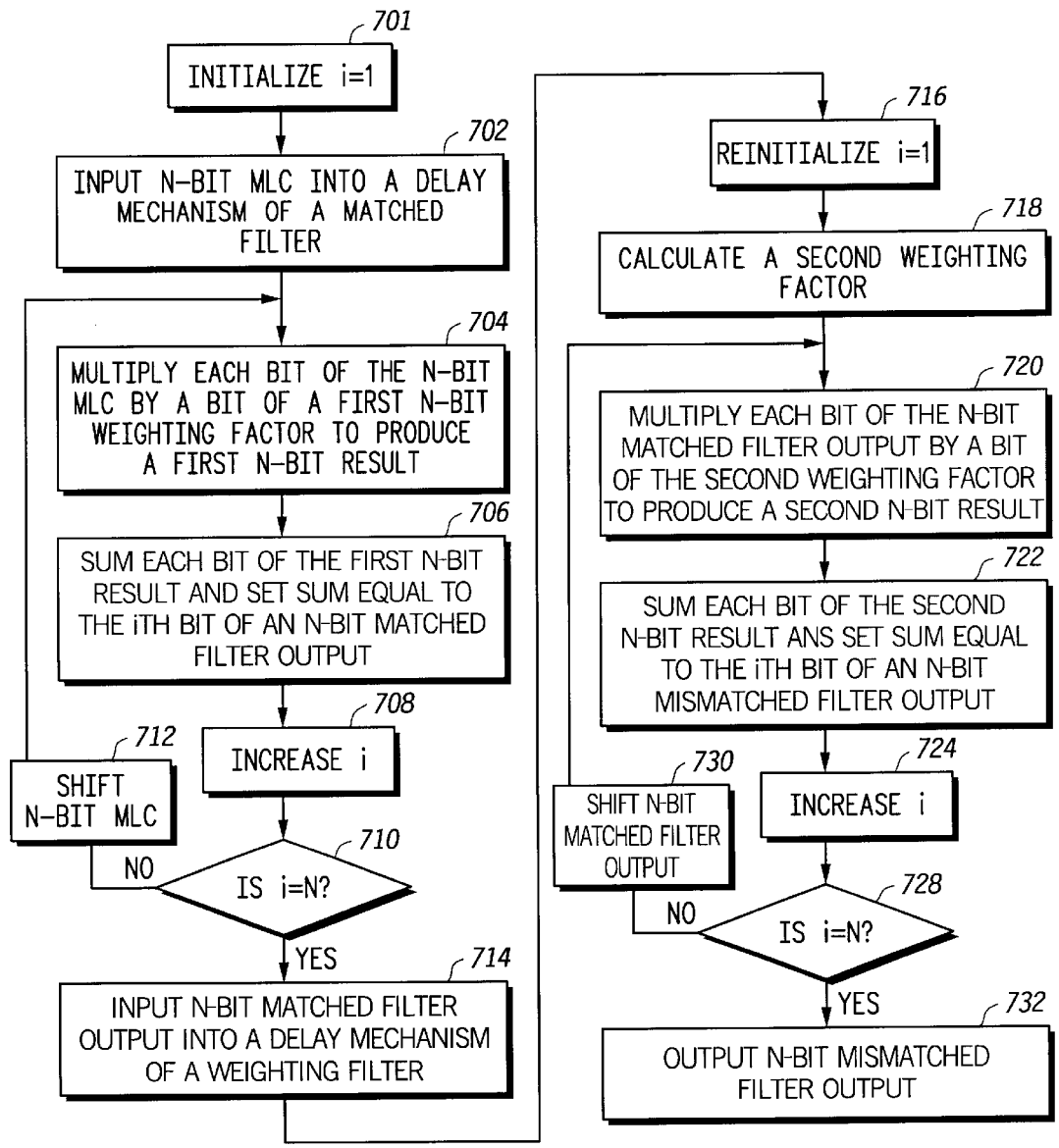
FIG. 7 is a flow diagram of the method of the present invention.

Referring to FIG. 7, a flow diagram of the presently preferred embodiment of the method (700) of the present invention is shown. In block 702, a variable "i", which is used to keep track of the number of times the N-bit MLC 202 is shifted, is initialized to "1". In block 702, the N-bit MLC 202 is input to a delaying mechanism of a matched filter 204. In block 704, each bit of the N-bit MLC 202 is multiplied by a bit of a first N-bit weighting factor 308 to produce a first N-bit result 310. In block 706, each bit of the first N-bit result 310 is added together and the sum 206 is set equal to the $i^{th}$ bit of an N-bit matched filter output 206. In block 708, variable "i" is increased. In decision block 710, the method determines whether "i" is equal to "N." If "i" is not equal to N (decision block 710), the N-bit MLC 202 is shifted (block 712) and the method repeats blocks 704 through 708. If "i" is equal to N (decision block 710), the N-bit matched filter output 206 is fed into a delaying mechanism of a weighting filter 208 (block 714). In block 716, variable "i" is reinitialized to 1. In block 718, the method calculates a second N-bit weighting factor 408. In block 720, each bit of the N-bit matched filter output 206 is multiplied by a bit of the second N-bit weighting factor 308 to produce a second N-bit result 410. In block 722, each bit of the second N-bit result 410 is added together and the second sum 210 is set equal to the $i^{th}$ bit of an N-bit mismatched filter output 210. In block 724, variable "i" is increased. In decision block 728, the method determines whether "i" is equal to "N." If "i" is not equal to N (decision block 728), the N-bit matched filter output 206 is shifted (block 730) and the method repeats blocks 720 through 724. If "i" is equal to N (decision block 724), the method outputs the N-bit mismatched filter output 210 (block 732).

As described above, the presently preferred embodiment of the mismatched filter 200 of the present invention can decode an N-bit input code and its N-1 delayed in time replicas to produce an output code containing a non-zero main output and offset outputs equal to zero. Thus, the present invention reduces signal interference from undesired signals and contributes to an increase in system capacity.

Those skilled in the art will recognize that various modifications and variations can be made in the apparatus and method of the present invention without departing from the scope or spirit of this invention.

What is claimed is:

1. A method of filtering a continuous and periodic signal coded by an N-bit maximum-length-code to reduce time-sidelobes of time-delayed replicas of the N-bit maximum-length-code to zero, the method comprising the steps of:

inputting the N-bit maximum length code into a first filter;

decoding by autocorrelation the N-bit maximum length code to produce a first N-bit output code; wherein one bit of the first N-bit output code corresponds to an amplitude of a decoded N-bit maximum length code and all other bits of the first N-bit output code corresponds to a decoded delayed in time replica of the N-bit maximum length code;

inputting the first N-bit output code into a second filter;

decoding by autocorrelation the first N-bit output code to produce a second N-bit output code; wherein one bit of the second N-bit output code corresponds to an amplitude of a decoded first N-bit output code and all other bits of the second N-bit output code correspond to an amplitude of a decoded delayed replica of the first N-bit output code and wherein the amplitude of the all other bits of the second N-bit output code is zero.

2. The method of claim 1 wherein the step of decoding by autocorrelation the first N-bit output code to produce a second N-bit output code comprises the steps of:

a) determining an N-bit weighting factor comprised of one weighting coefficient a0 and N-1 weighting coefficients a1, wherein a0 is equal to twice the value of a1;

b) initializing a variable;

c) multiplying the first N-bit output code by the N-bit weighting factor to produce an N-bit result;

d) adding each bit of the N-bit result to produce an $i^{th}$ bit of the second N-bit output code;

e) if the Nth bit of the second n-bit code has not been produced
e1) increasing the variable
e2) shifting the N-bit output code e3) repeating steps b) through e); and f) if the Nth bit of the second N-bit output code has been produced
f1) outputting the second N-bit output code.

3. The method of claim 2 wherein the one bit of the second N-bit output code has a value equal to $Na_o-(N-1)a_1$.

4. A method of filtering an N-bit maximum length code to reduce time-sidelobes of delayed in time replicas of the N-bit maximum length code to zero, the method comprising the steps of:

a) inputting the N-bit maximum length code into a first filter;

b) decoding by autocorrelation the N-bit maximum length code to produce a first N-bit output code; wherein one bit of the first N-bit output code corresponds to an amplitude of a decoded N-bit maximum length code and all other bits of the first N-bit output code corresponds to a decoded delayed in time replica of the N-bit maximum length code;

c) inputting the first N-bit output code into a second filter;

d) determining an N-bit weighting factor comprised of one weighting coefficient a0 and N-1 weighting coefficients a1, wherein a0 is equal to twice the value of a1;

e) initializing a variable;

f) multiplying the first N-bit output code by the N-bit weighting factor to produce an N-bit result;

g) adding each bit of the N-bit result to produce an $i^{th}$ bit of a second N-bit output code;

h) if the Nth bit of the second N-bit output code has not been produced
h1) increasing the variable
h2) shifting the first N-bit output code
h3) repeating steps f) through h); and f) if the Nth bit of the second N-bit output code has been produced
f1) outputting the second N-bit output code; and g) wherein the time sidelobes of the second N-bit output code have an amplitude of zero.

5. The method of claim 4 wherein a main output of the second N-bit output code has a value equal to $Na_o-(N-1)a_1$.

6. An apparatus for filtering an N-bit input code to reduce time-sidelobes of delayed in time replicas of the N-bit input code to zero comprising:

a first filter decoding by autocorrelation the N-bit input code and producing a first N-bit output code; and a second filter coupled to the first filter for calculating an N-bit weighting factor used in decoding by autocorrelation the first N-bit output code to produce a second N-bit output code wherein the second N-bit output code contains time-sidelobes equal to zero wherein the N-bit weighting factor is comprised of a center coefficient $a_0$ and N-1 other coefficients $a_1$ and wherein the value of the center coefficient and other coefficients is determined by the equation $a_0=2a_1$.

7. The apparatus of claim 6 wherein the first N-bit output code contains time-sidelobes equal to a non-zero value.

* * * * *